(12) United States Patent
Scherman et al.

(10) Patent No.: US 10,581,915 B2
(45) Date of Patent: Mar. 3, 2020

(54) NETWORK ATTACK DETECTION

(71) Applicant: Microsoft Technology Licensing, LLC, Redmond, WA (US)

(72) Inventors: Mathias Scherman, Tel Aviv-Jaffa (IL); Daniel Mark Edwards, Bothell, WA (US); Tomer Koren, Tel Aviv (IL); Royi Ronen, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 15/339,558

(22) Filed: Oct. 31, 2016

(65) Prior Publication Data

US 2018/0124073 A1   May 3, 2018

(51) Int. Cl.
*H04L 29/06*   (2006.01)

(52) U.S. Cl.
CPC ...... *H04L 63/1491* (2013.01); *H04L 63/1425* (2013.01)

(58) Field of Classification Search
CPC ............. H04L 63/1416; H04L 63/1425; H04L 63/1491
See application file for complete search history.

(56) References Cited

U.S. PATENT DOCUMENTS

| | | | | |
|---|---|---|---|---|
| 8,418,249 | B1 * | 4/2013 | Nucci ................... | G06F 21/552 706/20 |
| 8,676,729 | B1 * | 3/2014 | Keralapura ......... | H04L 63/1416 706/12 |
| 9,288,219 | B2 | 3/2016 | Abuelsaad et al. | |
| 9,306,962 | B1 | 4/2016 | Pinto | |
| 9,306,965 | B1 * | 4/2016 | Grossman ........... | H04L 63/1416 |
| 9,483,742 | B1 * | 11/2016 | Ahmed ............... | H04L 63/1441 |

(Continued)

FOREIGN PATENT DOCUMENTS

| | | |
|---|---|---|
| CN | 101848160 A | 9/2010 |
| CN | 101895420 A | 11/2010 |

(Continued)

OTHER PUBLICATIONS

Sourek, et al., "Learning to detect network intrusion from a few labeled events and background traffic", in Proceedings of 9th IFIP International Conference on Autonomous Infrastructure, Management, and Security, Jun. 22, 2015, 14 pages.

(Continued)

*Primary Examiner* — Joseph P Hirl
*Assistant Examiner* — Stephen T Gundry

(57) ABSTRACT

Enhancements to network security are provided by identifying malicious actions taken against servers in a network environment, without having to access log data from individual servers. Seed data are collected by an administrator of the network environment, from honeypots and servers whose logs are shared with the administrator, to identify patterns of malicious actions to access the network environment. These patterns of use include ratios of TCP flags in communication sessions, entropy in the use of TCP flags over the life of a communication session, and packet size metrics, which are used to develop a model of characteristic communications for an attack. These attack models are shared with servers in the network environment to detect attacks without having to examine the traffic logs of those servers.

20 Claims, 3 Drawing Sheets

(56) References Cited

U.S. PATENT DOCUMENTS

| | | | |
|---|---|---|---|
| 9,661,009 B1* | 5/2017 | Karandikar | H04L 63/14 |
| 9,769,204 B2* | 9/2017 | Vissamsetty | H04L 63/1491 |
| 9,860,208 B1* | 1/2018 | Ettema | G06F 21/602 |
| 9,942,270 B2* | 4/2018 | Vissamsetty | H04L 63/1491 |
| 2006/0107318 A1* | 5/2006 | Jeffries | H04L 63/1416 726/22 |
| 2014/0157405 A1 | 6/2014 | Joll et al. | |
| 2014/0201838 A1* | 7/2014 | Varsanyi | G06F 21/552 726/23 |
| 2015/0163242 A1 | 6/2015 | Laidlaw et al. | |
| 2015/0326589 A1* | 11/2015 | Smith | H04L 63/02 726/1 |
| 2015/0326599 A1* | 11/2015 | Vissamsetty | H04L 63/02 726/11 |
| 2016/0036837 A1 | 2/2016 | Jain et al. | |
| 2016/0142266 A1 | 5/2016 | Carroll et al. | |
| 2016/0359872 A1* | 12/2016 | Yadav | H04L 43/04 |
| 2017/0093910 A1* | 3/2017 | Gukal | H04L 63/1416 |
| 2017/0171244 A1* | 6/2017 | Vissamsetty | H04L 63/1491 |
| 2017/0244737 A1* | 8/2017 | Kuperman | H04L 63/1425 |
| 2017/0264639 A1* | 9/2017 | Sama | H04L 63/029 |
| 2017/0279830 A1* | 9/2017 | Mermoud | G16H 20/10 |
| 2017/0279832 A1* | 9/2017 | Di Pietro | H04L 63/1425 |
| 2017/0289186 A1* | 10/2017 | Staniford | H04L 63/1425 |
| 2017/0289191 A1* | 10/2017 | Thioux | H04L 63/1441 |
| 2017/0310692 A1* | 10/2017 | Ackerman | H04L 63/1425 |
| 2017/0310693 A1* | 10/2017 | Howard | H04L 63/1425 |
| 2017/0310703 A1* | 10/2017 | Ackerman | H04L 63/1458 |
| 2017/0332238 A1* | 11/2017 | Bansal | H04W 12/08 |
| 2017/0339178 A1* | 11/2017 | Mahaffey | H04L 41/142 |
| 2017/0359372 A1* | 12/2017 | Ronen | H04L 63/1458 |
| 2017/0374032 A1* | 12/2017 | Woolward | H04L 63/0263 |
| 2018/0007084 A1* | 1/2018 | Reddy | H04L 63/1458 |
| 2018/0026944 A1* | 1/2018 | Phillips | H04L 63/0263 726/4 |
| 2018/0054458 A1* | 2/2018 | Marck | H04L 63/1458 |
| 2018/0063199 A1* | 3/2018 | Lara | H04L 63/30 |
| 2018/0077178 A1* | 3/2018 | Beauchesne | G06N 5/022 |
| 2018/0096260 A1* | 4/2018 | Zimmer | G06N 5/04 |
| 2018/0103056 A1* | 4/2018 | Kohout | H04L 41/0686 |
| 2018/0139179 A1* | 5/2018 | Ettema | G06F 21/602 |
| 2018/0159852 A1* | 6/2018 | Crabtree | H04L 63/0876 |

FOREIGN PATENT DOCUMENTS

| | | |
|---|---|---|
| CN | 102111312 A | 6/2011 |
| CN | 103227738 A | 7/2013 |
| CN | 103607391 A | 2/2014 |

OTHER PUBLICATIONS

Miao, et al., "The Dark Menace: Characterizing Network-based Attacks in the Cloud", in Proceedings of the ACM Conference on Internet Measurement Conference, Oct. 28, 2015, 14 pages.

Toorn, et al., "A First Look at HTTP(S) Intrusion Detection using NetFlow/IPFIX", in Proceedings of IFIP/IEEE International Symposium on Integrated Network Management (IM), May 11, 2015, pp. 862-865.

Sanjuas, Josep, "Application of Machine Learning to Flow-based Network Monitoring", Retrieved on: Aug. 24, 2016 Available at: https://www.ietf.org/proceedings/95/slides/slides-95-nmlrg-1.pdf.

Li, et al., "A Machine Learning Approach for Efficient Traffic Classification", in Proceedings of IEEE 15th International Symposium on Modeling, Analysis, and Simulation of Computer and Telecommunication Systems, Oct. 24, 2007, 8 pages.

"#msexchange Brute force attacks prevention on #Webmail #OWA with #Syspeace #hacking #security", Published on: Jan. 14, 2015 Available at: https://syspeace.com/msexchange-brute-force-attacks-prevention-on-webmail-owa-with-syspeace-hacking-security/.

Soysal, et al., "Machine learning algorithms for accurate flow-based network traffic classification: Evaluation and comparison", in Journal Performance Evaluation archive, vol. 67, Issue 6, Jun. 2010, pp. 451-467.

* cited by examiner

NETWORK ATTACK DETECTION

BACKGROUND

Web servers provide computing resources for users to run their software on as part of the "cloud." These servers may be offered as part of a service from the cloud provider to the users, which may be classified as: Infrastructure as a Service (IaaS), where the user provides the operating system and software; Platform as a Service (PaaS), where the user provides the software and the cloud host provides the operation system; or Software as a Service (SaaS), where the cloud host provides both operating system and software to the user. Attacks on cloud services are growing in frequency and severity as more users move to the cloud; increasing the chances and potential rewards for a malicious party to attack those services.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and hardware embodiments of computer readable storage media are provided herein to detect malicious attacks via Internet Protocol (IP) flow signatures. Data related to IP flows are collected from one or more logs from active servers and honeypots in a cloud environment to develop attack models. The attack models are created in various aspects according to a reinforcement learning model, and are trained against IP flows known to have been malicious access attempts and IP flows that are believed to be benign. Ongoing network traffic is collected and compared to the attack models to determine whether the party communicating with the cloud service is malicious or benign, and appropriate measures are then taken.

By using the attack models to detect malicious network traffic to a server, the computer-centric problem of network security is addressed faster and more accurately than in prior systems or methods. An additional benefit of using the attack models is that the network administrator can detect malicious network traffic directed to computer devices in the administered network without requiring access to those devices or their logs; further improving the security of the network while preserving the privacy of its legitimate users.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
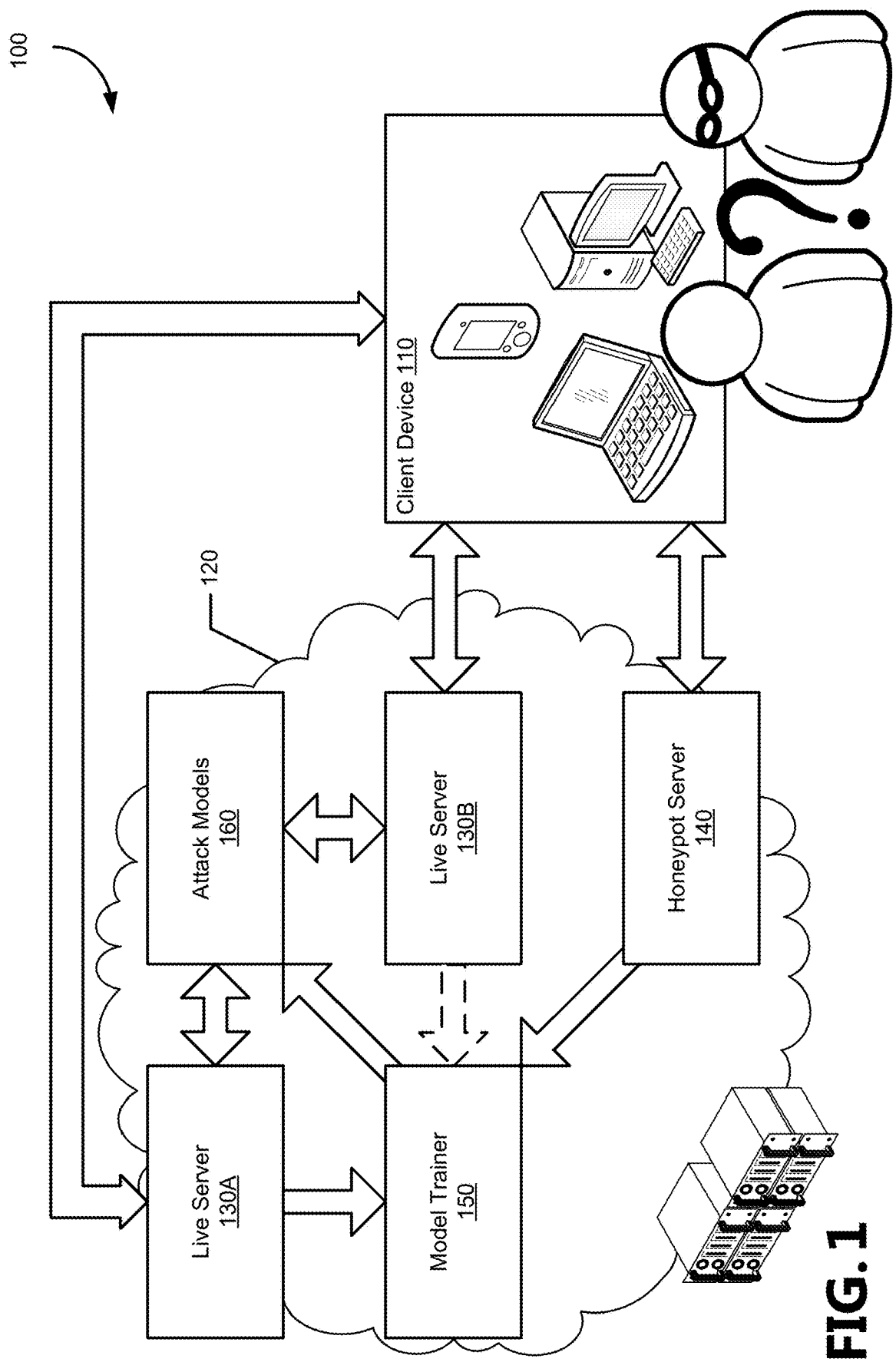
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and hardware embodiments of computer readable storage media are provided herein to detect malicious attacks via Internet Protocol (IP) flow signatures. Data related to IP flows are collected from one or more logs from active servers and honeypots in a cloud environment to develop attack models. The attack models are created in various aspects according to a reinforcement learning model, and are trained against IP flows known to have been malicious access attempts and IP flows that are believed to be benign. Ongoing network traffic is collected and compared to the attack models to determine whether the party communicating with the cloud service is malicious or benign, and appropriate measures are then taken.

By using the attack models to detect malicious network traffic to a server or other computing device, the computer-centric problem of network security is addressed faster and more accurately than in prior systems or methods. An additional benefit of using the attack models is that the network administrator can detect malicious network traffic directed to computer devices in the administered network without requiring access to those devices or their logs; further improving the security of the network while preserving the privacy of its legitimate users.

FIG. 1 illustrates an example environment 100 in which the present disclosure may be practiced. A client device 110 is in communication with one or more services provided by servers in a cloud service 120. The servers include live servers 130, that provide services to legitimate clients, and honeypot servers 140, that provide a security mechanism to detect malicious parties (and may simulate providing services). Each of the servers are in communication with a model trainer 150, which develops attack models 160 based on network traffic signatures of benign and malicious use. The attack models 160 are used in conjunction with the live servers 130 to detect malicious network traffic and to share security analyses across the cloud service 120. In various aspects, the live servers 130 include provider-operated live servers 130A, provided and used by the provider of the cloud service 120, and tenant-operated live servers 130B, provided by the provider of the cloud service 120 for use by a tenant or customer of the cloud service 120. Although the illustrated example shows a given number of components, one of ordinary skill in the art will recognize that more or fewer instances of each component may be present in other aspects.

The client devices 110, live servers 130, honeypot servers 140, and model trainer 150 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIG. 3. In various aspects, the illustrated systems may be run on dedicated hardware devices or as Virtual Machines (VMs) running on a shared infrastructure provided by the cloud service 120.

In various aspects, the client device 110, live servers 130, honeypot servers 140, and model trainer 150 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

Communications sent between computing devices in the example environment 100 include TCP/IP (Transmission Control Protocol/Internet Protocol) packets. As will be appreciated, a TCP/IP packet includes various segments in an initial portion of a communication, referred to as a header. Several bits of the header are reserved as flags to identify various features of the communication (i.e., the control bits or TCP flags). These flags include: Explicit Congestion Notification—Nonce Signaling (NS); Congestion Window Reduced (CWR); Explicit Congestion Notification Echo (ECE): Urgent (URG); Acknowledge (ACK); Push (PSH); Reset (RST); Synchronize (SYN); and Finis (FIN). Each flag signals to the receiving device how the TCP/IP packet should be handled. For example, a TCP/IP packet with the control bit for the SYN flag activated may be part of an initialization of communications between two devices, whereas a TCP/IP packet with the control bit for the FIN flag indicates that the sender has no more data to send.

Client devices 110 are operated by users, who may be humans or automated systems (e.g., "bots") to access the services provided by the cloud service 120. The users may be benign users, who are legitimately trying to access one or more live servers 130 hosted in the cloud service 120, or may be malicious users, who are seeking to surreptitiously gain access to or interfere with one or more of the live servers 130 or honeypot servers 140. In various aspects, the live servers 130 employ various countermeasures to detect malicious users and distinguish them from benign users, which include, but are not limited to, the model trainer 150 and attack models 160 discussed herein. A honeypot server 140 is designed to be accessed by malicious users, and fool the malicious users into believing that they have accessed a live server 130. In various aspects, the honeypot server 140, to improve its ability to appear as a live server 130 to malicious users, also employs various countermeasures, but such countermeasures may be purposely run with poor security practices (e.g., an easily guessed administrative password, like "admin") to allow malicious users to access the honeypot server 140. In other aspects, the honeypot server 140 does not employ countermeasures against malicious parties.

The model trainer 150 builds the attack models 160 based on seed data of known malicious access. Because benign users have no reason to access the honeypot server 140, the client devices 110 that do access the honeypot server 140 are inferred to be under the control of malicious users; providing log files with seed data for known malicious users. Additionally, log files from one or more live servers 130 may be provided to the model trainer 150 to provide additional seed data for users that have been detected as malicious by the countermeasures running on those live servers 130. The log files from the live servers 130 further provide data for users who are not suspected to be malicious that detail behaviors taken by users considered benign, which are also fed to the model trainer 150 as seed data.

As will be appreciated, not all live servers 130 in a cloud service 120 need to share their network traffic logs with the model trainer 150, but can still receive the benefits of the attack models 160 regardless of whether their log files are shared. For example, a provider-operated live server 130A, operated by the provider of the cloud service 120, will share its log files with the model trainer 150 to provide additional malicious seed data and benign seed data. A tenant-operated live server 130B, operated by a tenant of the cloud service 120, may choose to make its log files available to the model trainer 150 or keep its log files private. The model trainer 150, in turn, is operable to accept or reject log files made available from various live servers 130.

The log files, in various aspects, are formatted as IPFIX (IP Flow Information Export) data to provide flow data on the network traffic sent and received by the servers in the cloud service 120 in a standard format. In addition to log files, IPFIX data are also collectable in realtime, such as, for example, via a network probe. Flow data provide information on groupings of IP packets that share the same source, destination, and protocol. For example, a first set of flow data is gathered for metrics related to the source/destination/protocol tuple of (192.168.0.201)/(192.168.0.1)/(TCP/IP), while a second set of flow data is gathered for metrics related to a second tuple of (192.168.0.202)/(192.168.0.1)/(TCP/IP).

Although examples of identifiers for senders and receivers are given in terms of IP addresses, one of ordinary skill in the art will appreciate that other identifiers, such as MAC (Machine Access Control) addresses, may also be used. IP addresses for senders and receivers are present in TCP/IP headers, and for a given sender or receiver, the IP address is expected to remain the same for a long enough period of time to determine an access pattern for the client device 110 via the IPFIX data for a given IP address for the client device 110.

The IPFIX data for TCP/IP communications are collected and examined to determine access patterns of use associated with various clients and servers in the cloud service 120. Metrics related to the netflows are included in the IPFIX data for a given tuple, such as, for example, whether the destination was a honeypot server 140, times between requests to a destination server, and ratios of TCP flags in a communication session with a given server. Metrics include, but are not limited to: a number of incoming and outgoing flows from the cloud service 120 and a given client device 110, a ratio for each TCP flag in a flow, entropy of the distribution of the TCP flags (e.g., whether a ratio of flag types changes over the course of a flow), packet sizes of the flow (mean/median/modal average, standard deviation, maximum, minimum), time between communications, etc. According to one aspect, metrics include a ratio of SYN flags, a ratio of FIN flags, a ratio of ACK flags, and a measure of the entropy of the distribution of the TCP flags for the given netflow. In various aspects, metrics for flows are gathered separately for outbound flows (from the cloud service 120 to the client device 110) and inbound flows (from the client device 110 to the cloud service 120), but may also include combined flows (to and from the client device 110 and the cloud service 120). These netflow data and metrics are correlated with the determinations of whether the communications are to/from a malicious or benign user to develop the attack models 160. Metrics for flows are also gathered for flows from the client device to all the cloud servers and are averaged over the servers.

For example, netflows for client devices 110 seen communicating with a honeypot server 140 are determined to be with a malicious party (based on access to the honeypot server 140), and are examined to determine patterns of use and communication (with the honeypot server 140 and live servers 130 in the cloud service 120). Similarly, malicious users identified from log data as malicious have their netflows examined to determine patterns of use and communication within the cloud service 120. Netflow data from client devices 110 that have not attempted to access the honeypot servers 140 or have not otherwise presented themselves as malicious from the log data are also examined, but as benign parties. In various aspects, the benign users are further filtered to provide the netflows from benign users with a given length of access, a given confidence in their benign status (e.g., at least X % confident that the user is benign), or from users associated with a whitelist of known-benign users. The model trainer 150 defines the attack models 160 based on the observed patterns, and refines the attack models 160 using a machine learning approach, such as a random forest, that verifies its accuracy using the collected netflows (benign and malicious) as a training set to verify the accuracy of the attack models 160.

When training the attack models 160, one or more rules to identify malicious parties by their netflow characteristics are developed and tested against the training dataset. For example, a rule stating that a communication at least X packets in size from a client device 110 with a ratio of packets including SYN flags between Y % and Z % indicates malicious use patterns. In various aspects, the model trainer 150 iterates on the attack models 160 until an accuracy target is reached (e.g., X % correct identification of malicious/ benign for a dataset of Y netflow records) or for a set time period (e.g., the best model developed within m minutes). In various aspects, in addition to or instead of extrapolating and refining models based on netflow data in a cloud service 120, the administrators may manually define rules for use in an attack model 160 (e.g., defining a blacklist) or importing an attack model 160 from a second cloud service 120.

The model trainer 150 is operable to continuously or periodically (e.g., hourly, daily, weekly) receive new network traffic data to improve and adapt the attack models 160 to match the techniques used by malicious parties to attempt malicious access to servers in the cloud service 120. The values of metrics and characteristics associated with malicious communications in the attack models 160 will change according to the machine learning algorithm used and the ongoing actions taken by malicious parties, which the model trainer 150 will incorporate into the attack models 160 to adapt to new behaviors from malicious parties.

Various server types may be associated with attack models 160 that are specific to that type of server or with an attack model that is neutral to server type. For example, a live server 130 that is a Microsoft SQL SERVER® is provided a specific attack model 160 for the Microsoft SQL SERVERS®, and a live server 130 that is a MYSQL® (available from MySQL AB Aktiebolog, Uppsalla, SE) server is provided a specific attack model 160 for MYSQL® servers. Each of the live servers 130 (Microsoft SQL SERVER® and MYSQL® in the above example) may be provided with the specific attack models for different server types, as a malicious party may attempt to maliciously access a server not knowing the type of the server being accessed. Similarly, a type-neutral attack model 160, that is not specific to any given type of server, may be provided to each of the live servers 130 to identify shared or average characteristics in malicious access patterns on any type of live server 130.

The attack models 160 are provided to the live servers 130 to identify client devices 110 accessing them as either malicious or benign. For example, a live server 130 communicating with a client device 110 is operable to receive the attack model 160 and compare its netflow data against the model to determine whether the communications are indicative of malicious access patterns or benign access patterns. In another example, the live server 130 transmits its netflow data to a server hosting the attack models 160 to receive a determination of whether the communications are indicative of malicious access patterns.

The attack models 160 may be used in conjunction with additional security measures carried out on individual servers or the cloud service 120 as a whole. For example, when a client device 110 connects to the honeypot server 140, the IP address associated with that client device 110 may be shared to one or more live servers 130 to identify the client device 110 as malicious without the live servers 130 needing to consult the attack models 160. Similarly, when it is determined via an attack model 160 for a given live server 130 that a client device 110 is engaging in malicious behavior, that determination may be shared with other live servers 130 to protect them from the malicious user before the malicious user attempts to access those servers (or before they individually determine that the user is malicious).

Once a client device 110 is identified as engaging in malicious behavior, the live servers 130 or the cloud service 120 may take several actions to mitigate the malicious behavior. For example, the IP address of the client device 110 may be blacklisted (permanently or temporarily, to account for reassigned addresses), user accounts may be locked from access, the communications may be rerouted to a honeypot server 140, and other quarantining or observation actions may be taken to mitigate the risk of the malicious actions.

Figure 2:
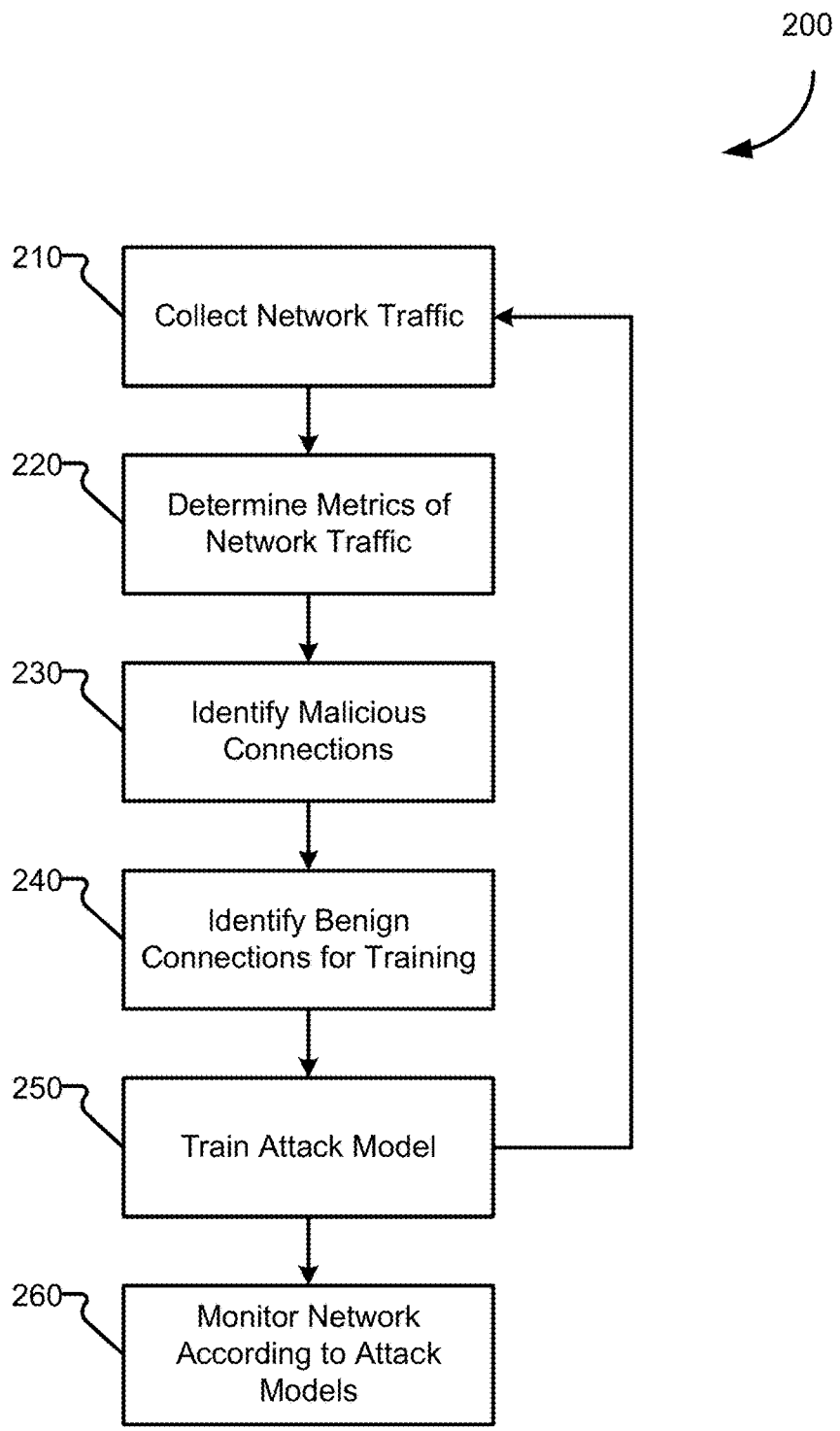
FIG. 2 is a flow chart showing general stages involved in an example method for identifying attacks and other malicious actions in a cloud service.

FIG. 2 is a flow chart showing general stages involved in an example method 200 for identifying attacks and other malicious actions in a cloud service 120 without requiring administrative access to the system under attack. Method 200 creates and continuously trains attack models 160 that are used to probabilistically determine whether a netflow is indicative of malicious behavior. As will be appreciated, although method 200 is discussed in relation to a given live server 130 and taking individual operations, the operations of method 200 may be run in series and in parallel regarding multiple live servers 130 within a cloud service 120.

At OPERATION 210 network traffic data are collected. In various aspects, the network traffic data are collected as IPFIX data. The IPFIX data are collected in realtime as communications are made to and from the live servers 130 and the honeypot servers 140 in the cloud service 120. In some aspects, the realtime IPFIX data are augmented with logged IPFIX data from provider-operated live servers 130A and the honeypots 140. In additional aspects, a model trainer 150 chooses whether to accept logged IPFIX data from one or more tenant-operated live servers 130B to further augment the network traffic data available to determine whether a communication is malicious or benign.

Proceeding to OPERATION 220, the metrics of the network traffic are determined. Each netflow, which includes one or more communications/transmissions sharing the IPFIX tuple of sender, receiver, and protocol (which may be further divided based on timeframe), is examined for various metrics, which are included in the data identified by that tuple. In some aspects, the metrics include size characteristics for a netflow, such as, for example, an average size of the packets, a maximum size of the packets, a standard deviation in the size of the packets, etc. In other aspects, the metrics include timing characteristics for a netflow, such as, for example, an average time between packets, a standard deviation in time between packets, a frequency at which connection attempts are made, etc. In further aspects, the metrics include TCP flag characteristics for a netflow, such as, for example a ratio for each TCP flag in the netflow, an entropy of each TCP flag over the course of the netflow, etc. As will be appreciated, metrics for the netflows for outbound communications (from the live servers 130) may be gather separately from the metrics for netflows for inbound communications (from client devices 110) or may be gathered together.

At OPERATION 230 malicious connections in the network traffic data are determined. In various aspects, the IP addresses (or other identifiers) for client devices 110 that have been observed attempting to access the honeypot server 140 are collected, and those client devices 110 are determined to be associated with malicious parties. In other aspects, the malicious parties are determined based on observations of traffics logs indicating suspicious behavior on a given live server 130 and their IP addresses (or other identifiers) are collected. For example, a number of connections within a time period, an untrusted domain, a number of failed login attempts, a number of forbidden actions requested, etc. may all be used to determine that a party is malicious from traffic logs.

The netflows from the malicious parties (i.e., those netflows that include the collected IP address and identifiers) are determined to be malicious connections. The netflows include those communications made to the honeypot server 140 or live server 130 that provided the determination that the client device 110 is malicious as well as to the other servers in the network; allowing the cloud service 120 to collect malicious communications from across multiple servers, which may be unaware that they are participating in communications with a malicious party. The model trainer 150 is operable to use these collected malicious communications as training or seed data to develop attack models 160 to protect the network and cloud service 120 from further malicious communications.

At OPERATION 240 the network traffic data that are not determined to include malicious connections are further filtered to determine benign connections to use as training or seed data. As will be appreciated, netflows that are not flagged as malicious at a given time may be flagged as malicious at a later time. For example, the first message in a brute force attack will look similar to a failed login attempt from a legitimate user (benign communication) whereas the tenth attempt in five seconds (due to the high volume in a short period) will be flagged as a malicious communication.

Therefore, the benign communications are further filtered to select benign communications with a high confidence score in being benign; not merely those communications not determined to be malicious. For example, a confidence level or confidence threshold may require the netflow to include at least X packets or Y communications, the IP address or other identifier to appear on a known-benign parties list, a stricter analysis according to the malicious party detection rules used on the traffic logs, etc.

The attack models 160 are trained at OPERATION 250 based on the training or seed data collected by the model trainer 150. The model trainer 150 uses a machine learning algorithm, such as, for example, a random forest model, to create several candidate attack models 160. The candidate attack models 160 are fed the training/seed data to predict whether the collected netflows are malicious or benign according to the candidate attack models 160. The data from benign communications and malicious communications are used to cross-validate the accuracy of the candidate attack models 160. The accuracy of the candidate attack models 160 are verified against the known malicious/benign status of the training/seed data, and the model trainer 150 adjusts the candidate attack models 160 for greater accuracy. In various aspects, an evolutionary approach is taken; selecting the X most accurate candidate attack models 160 and creating mutations from combinations/averages of those models to produce a new set of candidate attack models 160. The model trainer 150 may iterate its candidate attack models 160 until a given prediction accuracy is reached, a time limit is reached, or an administrator manually stops the iteration process.

Once the iteration process is complete, the candidate attack model 160 with the highest accuracy is selected as the attack model 160. In various aspects, specific attack models 160 are developed for specific types of servers in the cloud service 120. For example, netflows for a first server-type (including identifiers for live servers 130 of the first given type) are used to develop a first server-type attack model 160, whereas netflows for a second server-type (including identifiers for live servers 130 of the second given type) are used to develop a second server-type attack model 160. The netflows for all server types, or more than one server type defined in the cloud service 120 may also be used to create a type-neutral attack model 160. Server types may be defined in the cloud service 120 based on the functionality of the servers (e.g., Microsoft SQL SERVER®, NoSQL, MYSQL®, MongoDB® (available from MongoDB, Inc. of New York, N.Y.)), the operating system identity (including version) running on the servers, the physical hardware of the servers, etc.

Method 200 returns to OPERATION 210, to further refine the attack models 160 as more network traffic is received, and proceeds to OPERATION 260, where network access is monitored according to the attack models 160. Further communications received by the cloud service 120 and transmitted by the cloud service 120 are compared against one or more attack models 160, which may be specific or neutral to the type of server receiving/sending the transmissions. When the attack model 160 is satisfied, the cloud service 120 is operable to determine the transmissions and the associated client device 110 as malicious, and take the appropriate actions to mitigate the effect of the malicious party's actions on the network.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 3:
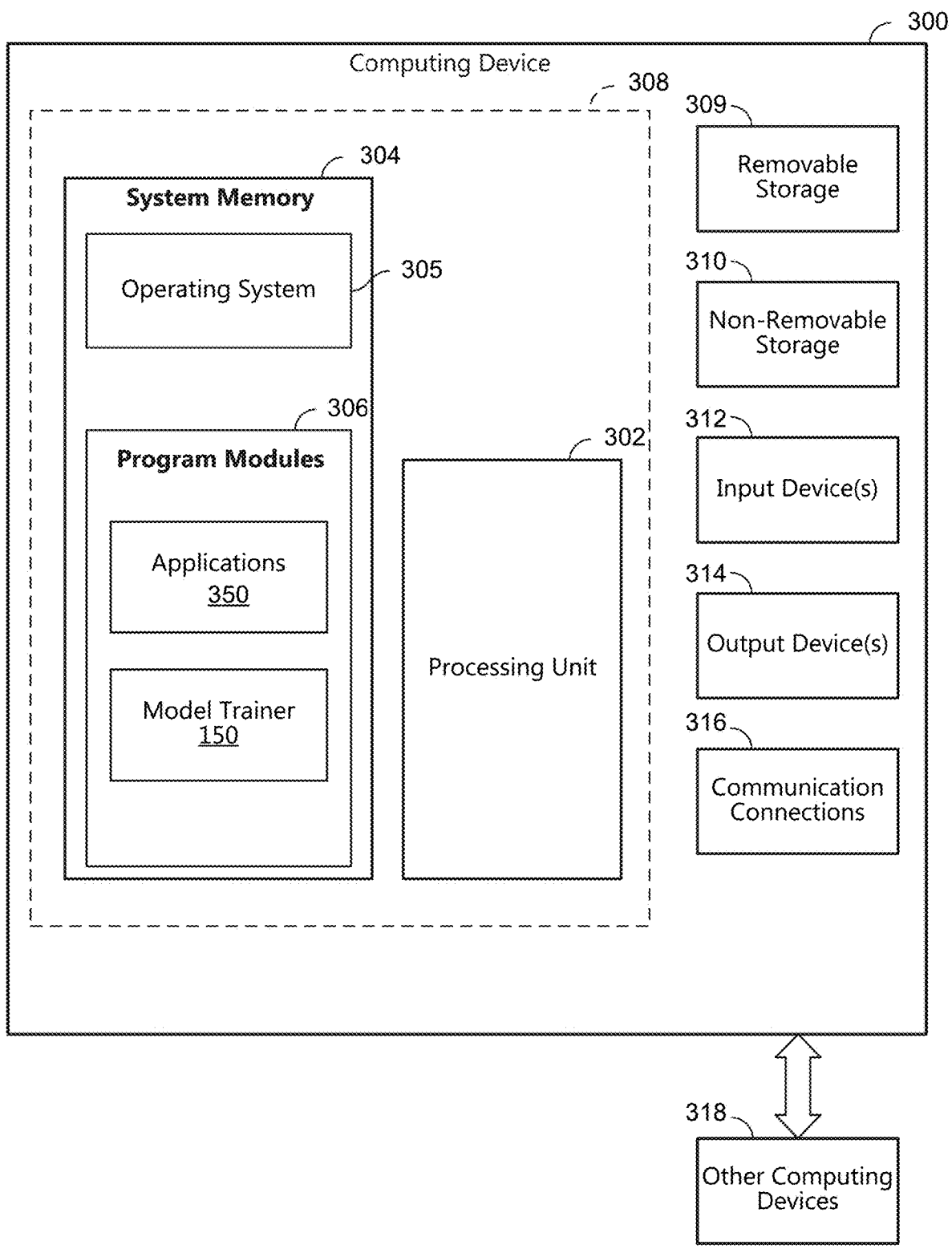
FIG. 3 is a block diagram illustrating example physical components of a computing device.

FIG. 3 and the associated description provide a discussion of a variety of operating environments in which examples are practiced. However, the devices and systems illustrated and discussed with respect to FIG. 3 are for purposes of example and illustration and are not limiting of a vast number of computing device configurations that are utilized for practicing aspects, described herein.

FIG. 3 is a block diagram illustrating physical components (i.e., hardware) of a computing device 300 with which examples of the present disclosure may be practiced. In a basic configuration, the computing device 300 includes at least one processing unit 302 and a system memory 304. According to an aspect, depending on the configuration and type of computing device, the system memory 304 comprises, but is not limited to, volatile storage (e.g., random access memory), non-volatile storage (e.g., read-only memory), flash memory, or any combination of such memories. According to an aspect, the system memory 304 includes an operating system 305 and one or more program modules 306 suitable for running software applications 350. According to an aspect, the system memory 304 includes the model trainer 150. The operating system 305, for example, is suitable for controlling the operation of the computing device 300. Furthermore, aspects are practiced in conjunction with a graphics library, other operating systems, or any other application program, and are not limited to any particular application or system. This basic configuration is illustrated in FIG. 3 by those components within a dashed line 308. According to an aspect, the computing device 300 has additional features or functionality. For example, according to an aspect, the computing device 300 includes additional data storage devices (removable and/or non-removable) such as, for example, magnetic disks, optical disks, or tape. Such additional storage is illustrated in FIG. 3 by a removable storage device 309 and a non-removable storage device 310.

As stated above, according to an aspect, a number of program modules and data files are stored in the system memory 304. While executing on the processing unit 302, the program modules 306 (e.g., model trainer 150) perform processes including, but not limited to, one or more of the stages of the method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 3 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 300 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 300 has one or more input device(s) 312 such as a keyboard, a mouse, a pen, a sound input device, a touch input device, etc. The output device(s) 314 such as a display, speakers, a printer, etc. are also included according to an aspect. The aforementioned devices are examples and others may be used. According to an aspect, the computing device 300 includes one or more communication connections 316 allowing communications with other computing devices 318. Examples of suitable communication connections 316 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 304, the removable storage device 309, and the non-removable storage device 310 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. According to an aspect, any such computer storage media is part of the computing device 300. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for detecting malicious access to a server, comprising:
    collecting network traffic data in a provider-tenant architecture;
    determining metrics of the network traffic data collected;
    identifying malicious communications in the network traffic data;
    identifying benign communications in the network traffic data;
    training an attack model based on the metrics associated with the network traffic data corresponding to the malicious communications and the metrics associated with the network traffic data corresponding to the benign communications, wherein the attack model is defined for a specific server-type to which the network traffic data are associated; and
    monitoring the server in the provider-tenant architecture according to the attack model to detect malicious access conforming to the metrics.

2. The method of claim 1, wherein the network traffic data and the attack model differentiate transmissions to the server from transmissions from the server.

3. The method of claim 1, wherein the network traffic data are collected in realtime from provider-operated servers, tenant-operated servers, and honeypot servers in the network and traffics logs associated with the provider-operated servers and the honeypot servers.

4. The method of claim 1, wherein the benign communications are identified from traffic logs received from provider-operated servers in a network, the benign communications satisfying a confidence level.

5. The method of claim 1, wherein the network traffic data are formatted as IPFIX (Internet Protocol Flow Information Export) data.

6. The method of claim 1, wherein the metrics include:
    a ratio of SYN flags for a given netflow of the network traffic data;
    a ratio of FIN flags for the given netflow;
    a ratio of ACK flags for the given netflow; and
    a measure of entropy of distribution of TCP flags for the given netflow.

7. The method of claim 1, wherein the metrics include:
    an average packet size of packets comprising a given netflow of the network traffic data;
    a standard deviation in packet size for the given netflow; and
    a maximum packet size for the given netflow.

8. The method of claim 1, wherein the metrics include:
    an average time between packets comprising a given netflow of the network traffic data; and
    a maximum time between packets for the given netflow.

9. The method of claim 1, wherein the malicious communications are identified in the network traffic data based on including an IP address observed in communications addressed to a honeypot server.

10. The method of claim 1, further comprising:
    determining metrics associated with benign communications in the network traffic data based on communication patterns for a benign party; and
    refine the attack model via a machine learning algorithm using the metrics associated with the network traffic corresponding to the benign communications to cross-validate the metrics associated with the network traffic corresponding to the benign communications and the metrics associated with the network traffic data corresponding to the malicious communications.

11. A system for detecting malicious access to a network, comprising:
    a processor; and
    a storage device, including instructions, that when executed by the processor are operable to provide a model trainer in communication with a live server and a honeypot server in the network, the model trainer operable to:
    receive netflow data from the live server and the honeypot server in a provider-tenant architecture;
    identify a party in the netflow data as a malicious party based on the party having communicated with the honeypot server;
    determine metrics associated with malicious communications in the netflow data based on communication patterns for the malicious party;
    produce an attack model based on the metrics associated with the malicious communications,
        wherein the live server is of a particular server-type and the attack model is associated with the specific server-type; and identify further communications in the provider-tenant architecture as further malicious communications based on the further communications satisfying the attack model.

12. The system of claim 11, wherein the netflow data include traffic logs.

13. The system of claim 12, wherein the traffic logs are used to identify a second party in the netflow data as a benign party.

14. The system of claim 13, wherein at least one of the traffic logs is received from a different live server in the network associated with the further communications.

15. The system of claim 11, wherein the netflow data include inbound network flows and outbound network flows.

16. A system for detecting malicious access to a network, comprising:
a processor; and
a storage device, including instructions, that when executed by the processor are operable to provide a model trainer in communication with a live server and a honeypot server in the network, the model trainer operable to:
receive netflow data from the live server and the honeypot server in a provider-tenant architecture;
identify a party in the netflow data as a malicious party based on the party having communicated with the honeypot server;
determine metrics associated with malicious communications in the netflow data based on communication patterns for the malicious party;
produce an attack model based on the metrics associated with the malicious communications; and
identify further communications in the provider-tenant architecture as further malicious communications based on the further communications satisfying the attack model,
wherein the model trainer is further operable to:
determine metrics associated with benign communications in the netflow data based on communication patterns for a benign party; and
refine the attack model via a machine learning algorithm using the metrics associated with the benign communications to cross-validate the metrics associated with the benign communications and the metrics associated with the malicious communications.

17. A system for detecting malicious access to a network, comprising:
a processor; and
a storage device, including instructions, that when executed by the processor are operable to provide a model trainer in communication with a live server and a honeypot server in the network, the model trainer operable to:
receive netflow data from the live server and the honeypot server in a provider-tenant architecture;
identify a party in the netflow data as a malicious party based on the party having communicated with the honeypot server;
determine metrics associated with malicious communications in the netflow data based on communication patterns for the malicious party;
produce an attack model based on the metrics associated with the malicious communications; and
identify further communications in the provider-tenant architecture as further malicious communications based on the further communications satisfying the attack model,
wherein the netflow data are formatted as IPFIX (Internet Protocol Flow Information Export) data.

18. The system of claim 17, wherein the live server is of a particular server-type and the attack model is associated with the specific server-type.

19. A computer readable storage device including instructions for detecting malicious access to a network, comprising:
collecting network traffic data in a provider-tenant architecture, wherein the network traffic data are formatted as IPFIX (Internet Protocol Flow Information Export) data;
determining metrics of the network traffic data collected, wherein the metrics are collected from network traffic data received by the network and transmitted by the network in realtime and from traffic logs from honeypot servers and provider-operated servers in the network, and wherein the metrics include:
a ratio of TCP (Transmission Control Protocol) flags in the network traffic data associated with a given client device in the provider-tenant architecture; and
an average frequency of connection attempts from the given client device;
identifying malicious connections in the network traffic data, wherein the malicious connections are made from IP (Internet Protocol) address that have communicated with the honeypot servers;
identifying benign connections in the network traffic data, wherein the benign connections comprise a subset of the network traffic that is not associated with accessing the honeypot servers and meets a confidence threshold for not being malicious;
training an attack model with a machine learning algorithm to predict whether a given communication is malicious or benign based on the metrics associated with the network traffic data corresponding to the malicious connections and the metrics associated with the network traffic data corresponding to the benign connections; and
monitoring communications in the network according to the attack model to detect whether the communications are malicious or benign, wherein monitoring communications in the network is not administratively accessing the client device.

20. The computer readable storage device of claim 19, wherein the ratio of TCP flags in the network traffic data associated with the given client device include:
a ratio of SYN flags;
a ratio of FIN flags;
a ratio of ACK flags; and
a measure of entropy of distribution of the TCP flags for the given netflow.

* * * * *